United States Patent [19]
Susset

[11] 3,940,563
[45] Feb. 24, 1976

[54] REFRAMING METHOD FOR A CARRIER SYSTEM HAVING A SERIAL DIGITAL DATA BIT STREAM

[75] Inventor: Dieter A. Susset, San Mateo, Calif.

[73] Assignee: TRW Inc., Los Angeles, Calif.

[22] Filed: Oct. 23, 1974

[21] Appl. No.: 517,229

[52] U.S. Cl. ............................................. 179/15 BS
[51] Int. Cl.² .......................................... H04J 3/06
[58] Field of Search ............ 179/15 BS; 178/69.5 R

[56] References Cited
UNITED STATES PATENTS

| | | | |
|---|---|---|---|
| 3,772,475 | 11/1973 | Loffreda | 179/15 BS |
| 3,794,773 | 2/1974 | Jacob | 178/69.5 R |
| 3,798,378 | 3/1974 | Epstein | 179/15 BS |

Primary Examiner—Kathleen H. Claffy
Assistant Examiner—B. S. Kemeny
Attorney, Agent, or Firm—Flehr, Hohbach, Test, Albritton & Herbert

[57] ABSTRACT

A reframing method for a T1 carrier type pulse code modulation digital data system utilizes the combination of the terminal frame code and the signalling code wherein four consecutive framing bits provide a unique four bit code indicating any one frame of a 12 frame. The method includes the steps of searching for the terminal frame code, synchronizing the framing code generator with the unique 4 bit code, and thereafter checking the three subsequent frames to insure proper reframing.

3 Claims, 5 Drawing Figures

REFRAME CONTROL

| MODE OF OPERATION | REFRAME F.F. | SEARCH F.F. | SYNC F.F. | CHECK F.F. |
|---|---|---|---|---|
| FRAMED | RESET | SET | SET | SET |
| LOAD | SET | SET | SET | SET |
| SEARCH | SET | RESET | SET | SET |
| SYNCRONIZE | SET | SET | RESET | SET |
| CHECK | SET | SET | SET | RESET |

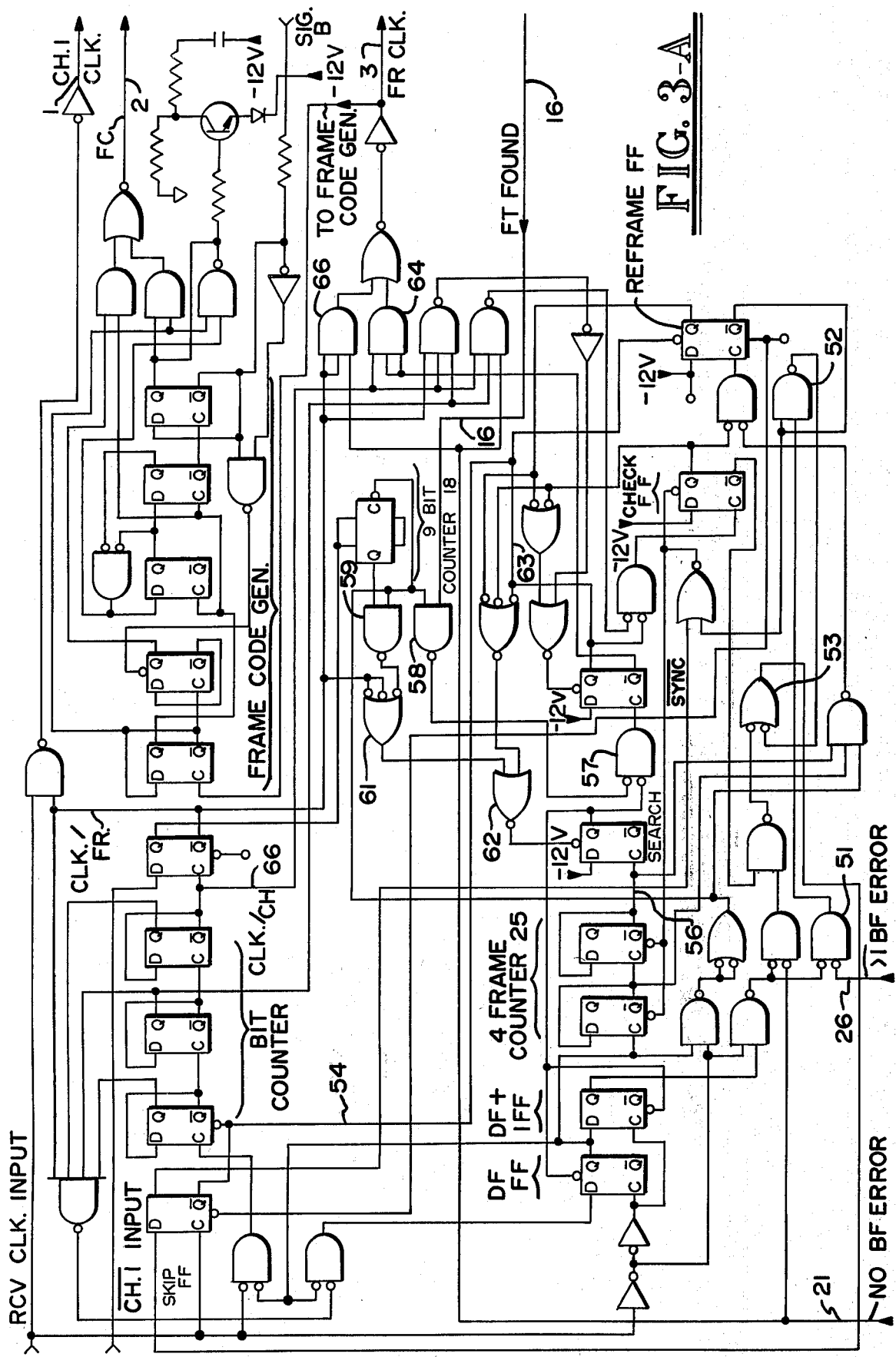

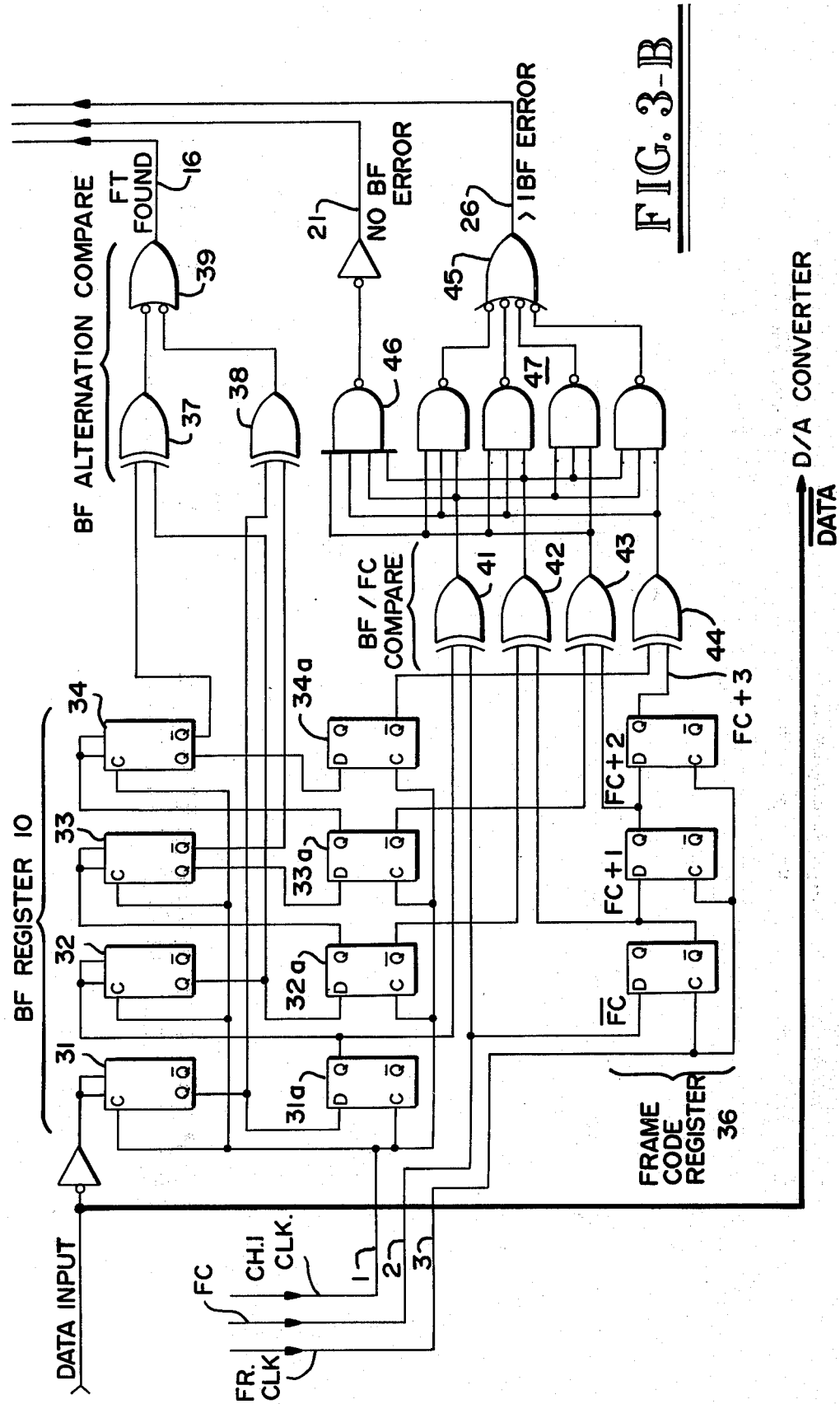
FIG. 3-B

REFRAMING METHOD FOR A CARRIER SYSTEM HAVING A SERIAL DIGITAL DATA BIT STREAM

BACKGROUND OF THE INVENTION

The present invention is directed to a reframing method and apparatus therefor for a carrier system having a serial digital bit stream and more particularly to a telephone type pulse code carrier system of the D2 or D3 type used in T1 systems.

In the D2/D3 PCM line format each frame consists of 193 bits; the first bit being a framing bit (BF or DF) the remaining 192 bits consisting of 24 channels of data with eight bits per channel. As is well known in the art each eight bit channel of a particular frame represents the analog voltage level of an incoming voice signal. Twelve such frames form a multiframe.

Within each multiframe the framing bit is divided into two codes; first the terminal frame code, $F_T$, which is presently used for frame detection and reframing and which consists of an alternating patter of one and zero bits every other frame; and secondly, the framing bits form a signalling frame code, $F_S$, which is used for signaling frame detection and consists of three 0 bits followed by three 1 bits, again every other frame. The two frame bit codes taken together repeat themselves every 12 frames which forms a multi-frame. FIG. 1 illustrates the foregoing patterns.

Since only the $F_T$ or terminal frame code is utilized for reframing and detecting framing errors single frequencies such as a 2 kHz tone which are transmitted over the carrier system may cause false reframing. In addition, merely using the terminal frame code for reframing incurs excessive time delays.

OBJECT AND SUMMARY OF THE INVENTION

It is, therefore, a general object of the present invention to provide an improved reframing method for a digital data carrier system which operates in a faster mode and is more resistent to false framing information which may be carried on the system lines.

In accordance with the above object, there is provided a reframing method for a carrier system having a serial digital data bit stream having framing and multiframes. The multiframes consist of a predetermined number of frames with each frame having an additional frame bit used as a terminal frame code which is an alternating pattern of 1 and 0 bits every other frame and used as a signalling frame code for signalling frame detection. This is a pattern of three 0 bits followed by three 1 bits on every other frame the frame bit codes repreating themselves every multiframe. The carrier system includes a frame code generator for generating the frame bit codes. The method comprises the steps of storing a plurality of corresponding data bits from each of at least four consecutive frames and searching for a valid terminal frame code in a group of 4 bits consisting of one corresponding bit from each of said four frames. The 4 bits, if valid, represent a unique frame of the multiframe. A comparison is made of the group of four bits in which a valid terminal frame code was found to 4 consecutive bits generated by the frame code generator. The generator is synchronized to generate the multiframe code corresponding to the 4 valid bits.

BRIEF DESCRIPTION OF THE DRAWINGS

FIGS. 3A and 3B are more detailed logic diagrams of FIG. 2; and

DETAILED DESCRIPTION OF THE PREFERRED EMBODIMENT

Figure 1:
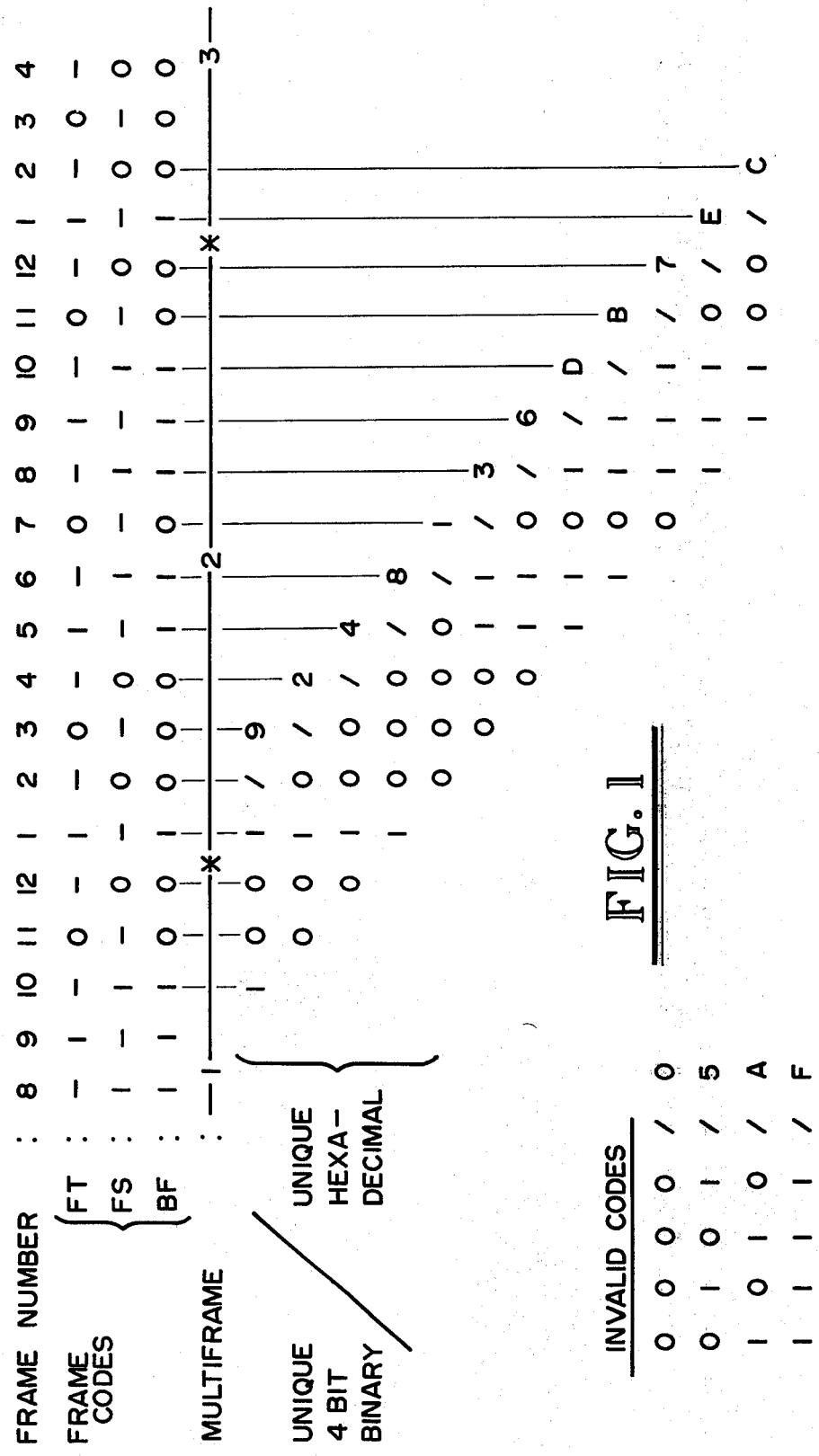
FIG. 1 is a table indicating the general framing scheme of a T1 carrier system including the framing codes and how the present invention utilizes these codes in a unique manner.

As discussed above, FIG. 1 illustrates the terminal framing code $F_T$ and the signalling code $F_S$. Their sum is represented by the line designated framing bit (BF). Four consecutive framing bits represents a unique four bit binary or hexidecimal code for each frame of the 12 frame multiframe. In addition, these 4 bits also have the characteristic that the $F_T$ or alternating frame code may be tested for validity with respect to this code. This is utilized to eliminate the four invalid codes that do not include the $F_T$ code which are the hexidecimal 0, 5, A and F as illustrated.

Figures 2, 4:
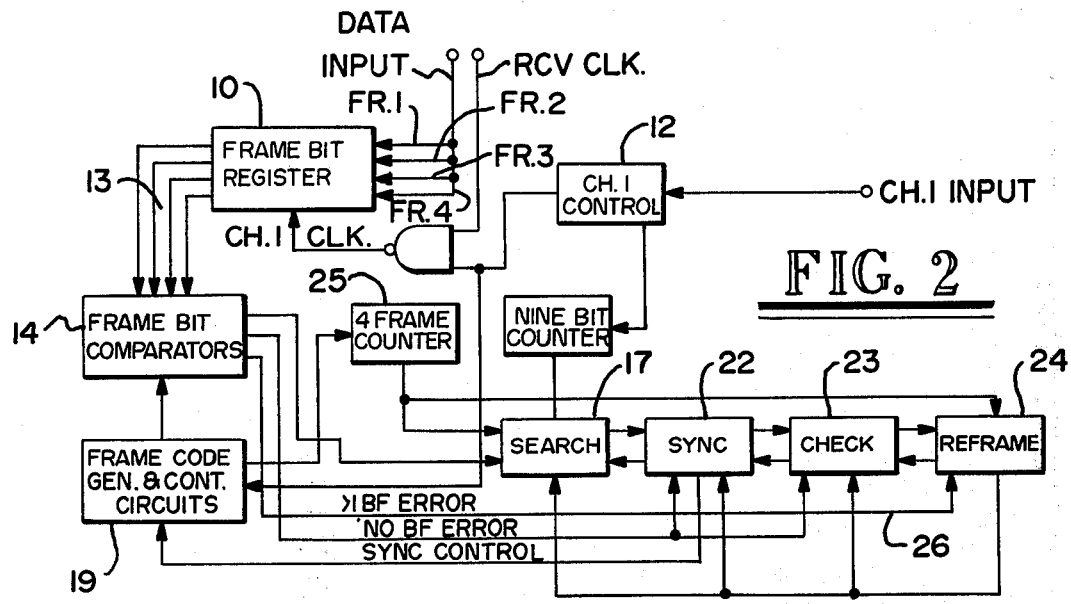
FIG. 2 is a block diagram embodying the present invention.
FIG. 4 is a table useful in understanding the method of the present invention.

Referring now to FIG. 2, the frame bit register 10 serves in essence as a serial to parallel and accepts the first 9 bits of four consecutive frames designated FR1 through FR4 from the received data input. These bits are clocked in by the channel 1 clock which is a combination of the receive clock on line 11 and the channel 1 control input from the unit 12. The first bit of each of the bit registers is coupled out on lines 13 and searched by unit 14 for a valid terminal frame bit code $F_T$. If this is found, it is indicated on line 16 to search unit 17. If not found, the second bit of each register which, of course, are all in the corresponding time slots for each frame, is searched. This continues until all nine bits have been searched unsuccessfully. Line bit to counter 18 provides control. If all 9 are searched unsuccessfully, the registers are reloaded with the next 9 bits of four consecutive frames. The procedure is repeated until the proper $F_T$ code is found. Once the code is found, such 4 bits, if valid, would of course represent a unique frame of the multiframe.

In order to synchronize to that specific multiframe the 4 valid bits are compared by comparator 14 to 4 consecutive bits generated by the frame code generator 19. If they do not compare, line 21 designated "no BF errors" actuates sync unit 22 to clock the frame code generator 19 rapidly until the frame code out of the generator is synchronized with the 4 bits stored in the register. Thereafter, three subsequent frames, under the control of four frame counter 25, are checked for errors by the check unit 23 and if no further errors are found, the system is properly in frame. Reframe unit 24 determines when the system is in a frame or nonframe condition. An out-of-frame indication occurs on line 26 when more than one error occurs in the comparison of the frame code with the four consecutive framing bits.

FIGS. 3A and 3B indicate the more detailed operation of the circuit of FIG. 2. The received data input indicated by the heavy line in FIG. 3B is connected to the frame bit register 10. This register consists of four 8 bit shift registers 31 through 34 for holding the respective information from four consecutive frames and in addition has associated with it four 1 bit registers 31a–34a. These provide the four consecutive bits which are first examined for the purpose of finding a $F_T$ alternating code and then compared with the frame code. Such frame code is generated by the frame code generator generally indicated at 19 whose output is stored in the frame code register 36. Line 1 to flip-flops 31a, 32a, 33a and 34a provides a channel 1 clock input and during the time slot of this channel provides for the nine pulses to shift in the bit information to the register 10. The line 2 input is the framing code output of the framing code generator 19 (FIG. 1) and the line 3 input is the framing clock which occurs once per frame. This serves to update the contents of the frame code register.

With respect to the testing for the $F_T$ terminal framing code there are provided exclusive OR gates 37 and 38. OR gate 37 compares the second and fourth bits in registers 32a and 34a for a alternation and OR gate 38 checks the first and third bits of one of these indicates an alternation in accordance with the $F_T$ code, the output of an OR gate 39 is driven true and an $F_T$ found indication is coupled to the proper control circuits. At the same time, a comparison is made of the framing code generated by the frame code generator with the four consecutive bits by means of exclusive OR gates 41, 42, 43 and 44. If true outputs are present on all four OR gates the AND gate 46 is closed to provide on the line 21 an indication of no framing bit (BF) error.

Lastly, each of the set of four AND gates 47 respectively have three inputs from a permutation of the exclusive OR gates 41, 42, 43 and 44 thus providing for an $\overline{ERROR}$ output on line 26 from the OR gate 45 if there is one error or less. As discussed above, reframing is therefore not initiated unless greater than one framing bit error in the unique 4 bit multiframe code is sensed.

Referring now to FIG. 3A and FIG. 4 there are four essential flip-flops; that is, reframe, search, sync and check which control the different modes of operation. These, of course, also have their associated control circuitry. As indicated by FIG. 4, the reframe flip-flop in the framed condition is in the reset mode with the remaining search, sync and check flip-flops being set. If line 26 indicates more than one error in the unique 4 bit multiframe code, the AND gate 51 is closed which in turn closes gate 52 and drives the OR gate 53 whose output activates the skip flip-flop causing the bit counter to skip one bit. The $\overline{Q}$ output of the skip flip-flop on line 54 is connected to the S or set terminal of the reframe flip-flop to set it.

Referring to Table 4, this places the circuit in the load mode. Here the first 9 bits of four consecutive frames are loaded into the register 10 (FIG. 3B). Four frame counter 25 as also illustrated in FIG. 2 indicates such loading and upon completion resets the search flip-flop by means of the clocking input on line 56.

The search mode search for a valid terminal frame code $F_T$ in the group of 4 bits. If there is a valid $F_T$ indication on line 16 of FIG. 3B, this activates the AND gate 57 which has as its inputs the $F_T$ line 16 through an AND gate 58 and the Q output of the search flip-flop. If no valid $F_T$ indication if found after the 9 bits have been exhausted, then the 9 bit counter 18 by means of the AND gate 58 does not allow the AND gate 57 to be closed and thus the sync flip-flop remains in its initial condition. Also, the 9 bit counter by the AND 59 and OR gates 61 and 62 resets the search flip-flop and thereby returns the circuit to the load mode where 9 more bits are loaded into register 10.

However, assuming a valid $F_T$ is found, the Q output of the sync flip-flop on line 63 activates an AND gate 64 to couple the clocking frequency on line 66 to clock line 3. Such clocking frequency represents one clock per channel. Previously AND gate 66 was supplying a frame clock both to the frame code generator 19 and the frame code generator 36 of FIG. 3B. Now, however, this action is speeded up to 1 clock per channel and both the frame code generator and its associated register 36 are speeded up or clocked rapidly until the frame code out of the generator is synchronized with four bits stored in registers 31a through 34a. When this occurs, no BF error is indicated on line 21 which sets the sync flip-flop and resets the check flip-flop. In accordance with the table of FIG. 4 this is check condition.

The next three multiframe codes are checked for accuracy. If no error is found, the four frame counter 25 causes the check flip-flop to be set which allows the reframe flip-flop to be reset wherein the control circuit is returned to the original framed condition.

In such framed condition, as discussed above, one error can be tolerated in the 4 bit comparison of the multiframe code. More than one error on line 26 will again start the reframing as discussed above.

Thus, the present invention has provided an improved method of reframe control which is highly immune to false reframing information. Also, by means of the unique four bit multiframe code, rapid framing is provided.

I claim:

1. In a reframing method for a carrier system having a serial digital data bit stream having frames and multiframes which consist of a predetermined number of frames each frame having an additional frame bit used as a terminal frame code which is an alternating pattern of 1 and 0 bits every other frame and used as a signalling frame code for signalling frame detection which is a pattern of three 0 bits followed by three 1 bits every other frame said frame bit codes repeating themselves every multiframe said carrier system including a frame code generator for generating said frame bit codes said method comprising the following steps: storing a plurality of corresponding bits from each of at least four consecutive frames; searching for a valid terminal frame code in a group of four bits consisting of 1 corresponding bit from each of said four frame, said 4 bits, if valid, representing a unique frame of said multiframe; comparing said group of 4 bits in which a valid terminal frame code was found to 4 consecutive bits generated by said frame code generator; and synchronizing said generator to generate said multiframe code corresponding to said 4 valid bits.

2. A method as in claim 1 including the step of checking the next three subsequent frames for error.

3. A method as in claim 1 where in an in frame condition at least one error is tolerated in said multiframe code before reframing.

* * * * *